(12) United States Patent
Jelinewski et al.

(10) Patent No.: US 12,166,382 B2
(45) Date of Patent: Dec. 10, 2024

(54) STATOR FOR AN ELECTRICAL MACHINE (71) Applicant: ZF Friedrichshafen AG, Friedrichshafen (DE)

(72) Inventors: Martin Jelinewski, Nonnenhorn (DE); Stephan Scharr, Friedrichshafen (DE); David Wörzler, Langenargen (DE); Mathias Döring, Schwarzach am Main (DE); Andreas Hölscher, Uhldingen-Mühlhofen (DE); Manfred Till, Friedrichshafen (DE); Eckhardt Lübke, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 257 days.

(21) Appl. No.: 17/770,429

(22) PCT Filed: Sep. 23, 2020

(86) PCT No.: PCT/EP2020/076553
§ 371 (c)(1),
(2) Date: Apr. 20, 2022

(87) PCT Pub. No.: WO2021/078458
PCT Pub. Date: Apr. 29, 2021

(65) Prior Publication Data
US 2022/0393526 A1 Dec. 8, 2022

(30) Foreign Application Priority Data

Oct. 21, 2019 (DE) .................. 10 2019 216 125.1

(51) Int. Cl.
*H02K 1/20* (2006.01)
*H02K 9/193* (2006.01)

(52) U.S. Cl.
CPC ............... *H02K 1/20* (2013.01); *H02K 9/193* (2013.01)

(58) Field of Classification Search
CPC ................... H02K 1/20; H02K 9/193
See application file for complete search history.

(56) References Cited

U.S. PATENT DOCUMENTS

| 5,317,224 A | 5/1994 | Ragaly |
| 9,148,034 B2 | 9/2015 | Cherney |

(Continued)

FOREIGN PATENT DOCUMENTS

| CN | 103069696 A | 4/2013 |
| CN | 107204676 A | 9/2017 |

(Continued)

OTHER PUBLICATIONS

WO-2018087017-A1_translate (Year: 2018).*

(Continued)

*Primary Examiner* — Tulsidas C Patel
*Assistant Examiner* — Mohammed Ahmed Qureshi
(74) *Attorney, Agent, or Firm* — Dority & Manning, P.A.

(57) ABSTRACT

A stator (2) for an electric machine (1) includes a laminated core (3) arranged axially between a first end plate (4) and a second end plate (5). A cooling line (6) for introducing a coolant into at least one distribution duct (7) at the particular end plate (4, 5) is arranged outside the end plates (4, 5) and the stator (2) and is fluidically connected to the at least one distribution duct (7) in the particular end plate (4, 5). The laminated core (3) includes multiple axial ducts (8) for guiding the coolant through the stator (2). The axial ducts (8) are fluidically connected to the at least one distribution duct (7) in the particular end plate (4, 5) for the inflow of the coolant. An outflow for the coolant is formed by at least one end-face opening (9) in the particular end plate (4, 5). The (Continued)

at least one opening (9) is configured for spraying the coolant out of the axial ducts (8) onto winding overhangs (10) of the stator (2).

14 Claims, 3 Drawing Sheets

(56) References Cited

U.S. PATENT DOCUMENTS

| | | | |
|---|---|---|---|
| 9,768,666 | B2 | 9/2017 | Büttner et al. |
| 10,008,907 | B2 | 6/2018 | Hanumalagutti et al. |
| 2012/0001504 | A1* | 1/2012 | Erfanfar .................. B60K 6/48 |
| | | | 310/54 |
| 2013/0076171 | A1 | 3/2013 | Lepres et al. |
| 2013/0193786 | A1 | 8/2013 | Cherney |
| 2018/0054095 | A1* | 2/2018 | Dlala ...................... H02K 1/16 |
| 2019/0207439 | A1* | 7/2019 | Marino .................... H02K 1/20 |
| 2020/0185986 | A1 | 6/2020 | Lewandowski et al. |

FOREIGN PATENT DOCUMENTS

| | | |
|---|---|---|
| DE | 19716758 A1 | 10/1998 |
| DE | 102011082353 A1 | 3/2013 |
| DE | 102013201501 A1 | 8/2013 |
| DE | 102012022453 A1 | 5/2014 |
| DE | 102017105665 A1 | 9/2017 |
| DE | 102017214427 B4 | 2/2019 |
| DE | 102018203939 A1 | 9/2019 |
| EP | 3499685 A2 | 6/2019 |
| WO | WO 91/11845 A1 | 8/1991 |
| WO | WO 2012/003208 A2 | 1/2012 |
| WO | WO-2018087017 A1 * | 5/2018 |

OTHER PUBLICATIONS

International Search Report (English Translation) PCT/EP2020/076553, dated Dec. 4, 2020. (2 pages).

German Office Action 102019216125.1, dated Jun. 3, 2020. (10 pages).

Chinese Office Action Corresponding to Application No. 202080063474.4 dated Jan. 18, 2024.

* cited by examiner

STATOR FOR AN ELECTRICAL MACHINE

CROSS-REFERENCE TO RELATED APPLICATIONS

The present application is related and has right of priority to German Patent Application No. 102019216125.1 filed in the German Patent Office on Oct. 21, 2019 and is a U.S. national phase of PCT/EP2020/076553 filed in the European Patent Office on Sep. 23, 2020, both of which are incorporated by reference in their entirety for all purposes.

FIELD OF THE INVENTION

The invention relates generally to a stator for an electric machine and to an electric machine having a stator of this type, wherein the electric machine is configured for driving a motor vehicle.

BACKGROUND

An effective cooling of an electric machine is necessary so that the electric machine for driving a motor vehicle can be operated at high power levels. The waste heat of the electric machine arising at high power levels can be power-limiting for certain applications, for example, electrically driven axles. It is not only the temperature of the rotor of the electric machine that is critical, but also the temperature of the stator of the electric machine, in particular in winding overhangs and grooves of the stator. As soon as the electric machine exceeds a limiting temperature, a control unit of the electric machine typically reduces the power.

For example, DE 10 2017 214 427 B4 discloses a stator for an electric machine, including a stator laminated core and including at least one end cap following the stator laminated core in the axial direction of the stator. A line element is formed separately from the end cap and separately from the stator laminated core, wherein the line element, in a subarea, is reshaped and, as a result, expanded. The line element is designed as an inherently stiff pipe element and includes a first cooling duct, through which a cooling medium can flow. A first longitudinal portion of the first cooling duct extends in the stator laminated core and a second longitudinal portion of the second cooling duct extends in the end cap. The end cap includes at least one second cooling duct, through which the cooling medium can flow and which is fluidically connected to the first cooling duct.

SUMMARY OF THE INVENTION

Example aspects of the present invention provide a stator for an electric machine and an electric machine having improved cooling.

A stator for an electric machine according to example aspects of the invention includes a laminated core, which is arranged axially between a first end plate and a second end plate. A cooling line for introducing a coolant into at least one distribution duct at the particular end plate is arranged outside the end plates and the stator and is fluidically connected to the at least one distribution duct in the particular end plate. The laminated core includes multiple axial ducts for guiding the coolant through the stator. The axial ducts are fluidically connected to the at least one distribution duct in the particular end plate for the inflow of the coolant. An outflow for the coolant is formed by at least one end-face opening in the particular end plate. The at least one opening is configured for spraying the coolant out of the axial ducts onto winding overhangs of the stator.

As may be seen from the above, the at least one distribution duct is designed for delivering coolant out of the cooling line into the axial ducts of the laminated core, and the at least one opening is configured for spraying the coolant out of the axial ducts onto the winding overhangs of the stator. Due to the large and direct wetting of the surfaces of the winding overhangs by coolant out of the axial ducts, the cooling potential of the electric machine increases, and a direct and immediate cooling is effectuated at the point of the heat development, in particular at the winding overhangs of the stator.

Preferably, multiple distribution ducts and openings are formed in the particular end plate. The two end plates are therefore provided for the inflow of the coolant into the axial ducts as well as for the outflow of the coolant out of the axial ducts. A fluidic connection is to be understood as a connection between two fluid-conveying components or ducts, which effectuates a flow of the coolant.

The electric machine also includes, in addition to the housing-affixed stator, a rotatable rotor having a rotor shaft, which is arranged within the stator. In particular, the electric machine can be operated as a motor or as a generator. When the electric machine is operated as a motor, an, in particular, time-varying voltage can be applied to the stator and to the windings located therein, in order to generate a time-varying magnetic field, which acts in the rotor to induce a torque and, thus, generate a turning motion. When the electric machine is operated as a generator, for example, electrical energy can be generated by inducing a varying magnetic field, for example, via rotation of the rotor, in a looped or coiled conductor of the stator, in order to induce a current in the conductor.

Preferably, the rotor shaft can be cooled with coolant via a cooling duct formed therein. The term coolant is to be understood as a cooling medium, in particular a cooling liquid, for example, based on oil or based on water. The coolant is provided for absorbing and dissipating heat.

The coolant flows, according to example aspects of the invention, via the cooling line into the two end plates. The coolant in the end plates is directed via the at least one distribution duct to the axial ducts in the laminated core of the stator, and the coolant is sprayed out of the axial ducts via the at least one opening in the particular end plate onto the winding overhangs of the stator in order to cool the stator not only from the inside via the coolant-conveying axial ducts but rather also from the outside via the surface of the winding overhangs that has been sprayed with coolant. Along the flow path, the coolant withdraws heat from the particular components, through which coolant flows or which are wetted, and thereby cools the particular components. Thereafter, the coolant is collected and re-cooled, for example, by a heat exchanger, in order to then be routed back to the cooling line and, in this way, form a cooling circuit.

A cooling line is to be understood as a coolant-conveying element, for example, a hose, a pipe, or a housing section having a cooling duct formed therein. The cooling line is arranged outside the stator and the end plates, in particular between a first electric machine and a second electric machine, wherein both electric machines are supplied with coolant out of the cooling line.

The laminated core includes sheet metal layers arranged, for example, consecutively or one behind the other in the axial direction of the stator. Radially formed and axially extending stator teeth are arranged in recesses of the laminated core, wherein the stator teeth accommodate coils of an electric winding. For example, the axial ducts are arranged in the area of stator teeth and extend essentially in parallel to and across the entire axial length of the stator teeth. The areas at the stator teeth are magnetically favorable for the arrangement of the axial ducts, because a short thermal active chain or short thermal flow path can be established as a result. Preferably, the metal sheets of the laminated core form the wall of the particular axial ducts, wherein the coolant then directly contacts surfaces of the laminated core while flowing through the axial ducts.

Preferably, the axial ducts are adjacent to the stator teeth in the radial direction toward the outside. In particular, each axial duct is formed centrally between two stator grooves in the circumferential direction. According to one preferred example embodiment, each axial duct is formed centrally between two stator grooves in the circumferential direction and outside the stator teeth in the radial direction. The closer the axial ducts are arranged at the heat-developing components of the stator, the smaller is the thermal action chain or thermal flow path and the higher is the efficiency of the cooling.

For example, multiple deflection ducts are arranged in the particular end plate, wherein the particular deflection duct is configured for deflecting the coolant out of one of the axial ducts into an axial duct adjacent thereto in the circumferential direction. The particular deflection duct is preferably designed as an elongate groove in the circumferential direction and fluidically connects two axial ducts to each other, which are adjacent to each other in the circumferential direction. Consequently, the coolant flows via the cooling line into the particular end plate. The coolant in the particular end plate is directed via the at least one distribution duct to the axial ducts in the laminated core of the stator, wherein, furthermore, the coolant is deflected by one hundred and eighty degrees (180°) via the particular deflection duct in the particular other end plate and is introduced into an axial duct that is adjacent in the circumferential direction. The coolant is sprayed out of the axial ducts onto the winding overhangs of the stator via the at least one opening in the particular end plate, in which the coolant was delivered via the at least one distribution duct.

For example, the at least one distribution duct and/or the at least one deflection duct are/is each formed as an indentation in an end face of the particular end plate facing the laminated core. Consequently, either the at least one distribution duct or the at least one deflection duct is formed as an indentation in the end face of the particular end plate facing the laminated core. Alternatively, the at least one distribution duct as well as the at least one deflection duct are both formed as an indentation in the end face of the particular end plate facing the laminated core.

The particular end plate comes to rest axially against a particular end-face end of the laminated core and, in fact, in such a way that at least the at least one distribution duct and the particular deflection duct rest against the laminated core in a fluid-tight manner. Consequently, a seal of the at least one distribution duct and of the particular deflection duct is formed at the laminated core at least indirectly, for example, via at least one seal between the particular end plate and the laminated core, or directly, and so no coolant can unintentionally flow out of the at least one distribution duct or the particular deflection duct via the end faces of the laminated core. In particular, the particular end plate is axially clamped with the particular laminated core.

For example, an inflow for the coolant is formed at an outer circumference of the particular end plate, and the inflow is fluidically connected to the at least one distribution duct. The inflow at the particular end plate is preferably formed at the outer circumference of the particular end plate via a section that is delimited in the circumferential direction, and is fluidically connected to the cooling line via a feed duct. The inflow preferably has the same indentation as the distribution duct in the end face of the particular end plate.

According to one preferred example embodiment, the at least one distribution duct is formed at the particular end plate continuously, at least partially or in sections, in the circumferential direction. Consequently, the at least one distribution duct is formed annularly in the end face of the particular end plate, and the inflow of the coolant takes place via the outer circumference of this annular geometry. The particular end plate includes, in particular, a central bore for the axial passage of the stator windings. The particular end plate having the central bore is adjacent to the stator windings.

Preferably, the at least one distribution duct includes multiple recesses formed in the radial direction for introducing the coolant into the particular axial duct. For example, the recesses are formed radially inward at an inner circumference of the annular distribution duct. The recesses preferably have the same indentation in the end face of the particular end plate as the distribution duct and, in the installed condition of the end plates at the stator, are positioned with respect to the axial ducts in such a way that coolant flows through each recess into a particular axial duct aligned therewith.

According to one preferred example embodiment of the invention, each deflection duct is formed between a recess and an opening in the circumferential direction. For example, a recess for introducing the coolant into a particular first axial duct, a deflection duct for deflecting the coolant out of the particular first axial duct into a second axial duct, which is adjacent thereto in the circumferential direction, and an opening for spraying the coolant out of the particular second axial duct onto the winding overhangs of the stator are arranged in the circumferential direction in both end plates. In particular, the recess, the deflection duct, and the opening uniformly repeat in the circumferential direction at the particular end plate, wherein the recess is fluidically connected to precisely one axial duct, wherein, furthermore, the deflection duct is fluidically connected to precisely two axial ducts, and wherein the opening is fluidically connected to precisely one axial duct, wherein the four aforementioned axial ducts are formed adjacent to one another in the aforementioned order in the circumferential direction.

Preferably, the at least one opening is configured for accommodating an orifice. An orifice is to be understood as an element that at least partially closes the particular opening and/or changes a cross-section of the particular opening in such a way that the flow rate and, in particular, also a spray direction and a spray jet are adjusted. In addition to the flow rate, the orifice also adjusts a pressure of the coolant in the axial ducts.

Preferably, the axial ducts are formed in the laminated core so as to be continuously distributed over the circumference of the stator. In other words, the stator is cooled via the axial ducts formed in the laminated core continuously in the circumferential direction, i.e., over three hundred and sixty degrees (360°). For example, the axial ducts are formed uniformly, preferably symmetrically in the laminated core of the stator and extend in parallel to an axis of rotation of the rotor shaft from one end-face end to the other end-face end of the stator.

According to one preferred example embodiment of the invention, the axial ducts are configured in such a way that coolant can flow through these, in alternation, from the first end plate to the second end plate in order to establish a homogeneous temperature distribution over the circumference of the stator. Consequently, the axial ducts and the end plates are designed in such a way that the through-flow of coolant, i.e., the through-flow of coolant in the axial ducts, takes place in alternation from the first end plate to the second end plate and from the second end plate to the first end plate in the circumferential direction. As a result, not only are a homogeneous cooling and temperature distribution achieved in the stator, but also a homogeneous cooling of the winding overhangs of the stator on both sides.

In order to establish a homogeneous temperature distribution over the circumference of the stator, the coolant is introduced into the axial ducts, for example, via the first end plate and is discharged out of the axial ducts via the second end plate and sprayed onto the winding overhangs of the stator. In every second axial duct as viewed in the circumferential direction, the coolant is then introduced into the axial ducts via the second end plate and discharged out of the axial ducts via the first end plate and sprayed onto the winding overhangs of the stator.

Alternatively, an alternating direction of through-flow in the axial ducts can also be achieved, for example, due to the fact that coolant is introduced into the axial ducts via the first end plate, deflected via the second end plate into a particular second axial duct that is adjacent thereto in the circumferential direction and, via this second axial duct, is introduced back into the first end plate, wherein the coolant is sprayed out of the first end plate onto the winding overhangs of the stator. In every third axial duct as viewed in the circumferential direction, coolant is then introduced into the axial ducts via the second end plate, deflected via the first end plate into a particular fourth axial duct that is adjacent in the circumferential direction and, via this fourth axial duct, is introduced back into the second end plate, wherein the coolant is sprayed out of the second end plate onto winding overhangs of the stator.

For example, cooling fins for heat dissipation are formed in the axial ducts. The heat dissipation is improved by the cooling fins in the axial ducts and, in fact, by achieving a greater wetting of the area that is effective for the cooling. For example, the flow speed of the coolant in the axial ducts is also increased by cooling fins in the axial ducts due to the reduction of the cross-section. In particular, the efficiency of the cooling fins can be increased when the flow at the cooling fins is established in a laminar manner at least partially or in sections. An optimized flow guidance of the coolant for improved heat dissipation can be achieved, in particular, by adapting geometries as well as targeted deflections and a through-flow of the axial ducts with coolant alternating over the circumference.

According to one preferred example embodiment of the invention, the particular cooling fin has a first web, a second web, and a third web, wherein the three webs divide the axial duct into three axial duct areas and extend at least partially in the axial direction of the axial duct. In particular, the particular cooling fin in the particular axial duct extends across the entire length of the axial duct. The first web, the second web, and the third web are designed in such a way that they extend radially inward from the wall of the axial duct and meet in a common center. The three webs can be, for example, equally long or have different lengths. In particular, only two of the three webs can be equally long. Preferably, the three axial duct areas are designed to be at least partially elliptical. According to one preferred example embodiment, the three axial duct areas are designed to be essentially heart-shaped. Further preferred example embodiments for the three axial duct areas are represented, in particular, in FIG. 6 and FIG. 7.

According to one preferred example embodiment of the invention, the axial ducts include a fluid seal. For example, the fluid seal of the axial ducts takes place via bonding of the laminated core of the stator. According to one further example, the fluid seal of the axial ducts takes place via inserts, which are fluid-tight and adapt to the geometry of the particular axial duct, i.e., are designed to be corresponding thereto. For example, an insert is to be understood as a circumferentially closed hose or as piping the particular axial duct.

Example aspects of the invention further relates to an electric machine for driving a motor vehicle, including a stator according to example aspects of the invention. The electric machine is utilized either alone or in combination with a further electric machine or an internal combustion engine for driving the motor vehicle. For example, the electric machine is configured for driving an axle of the motor vehicle.

BRIEF DESCRIPTION OF THE DRAWINGS

Preferred exemplary embodiments of the invention are explained in greater detail in the following with reference to the drawings, wherein identical elements are labeled with the same reference character, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
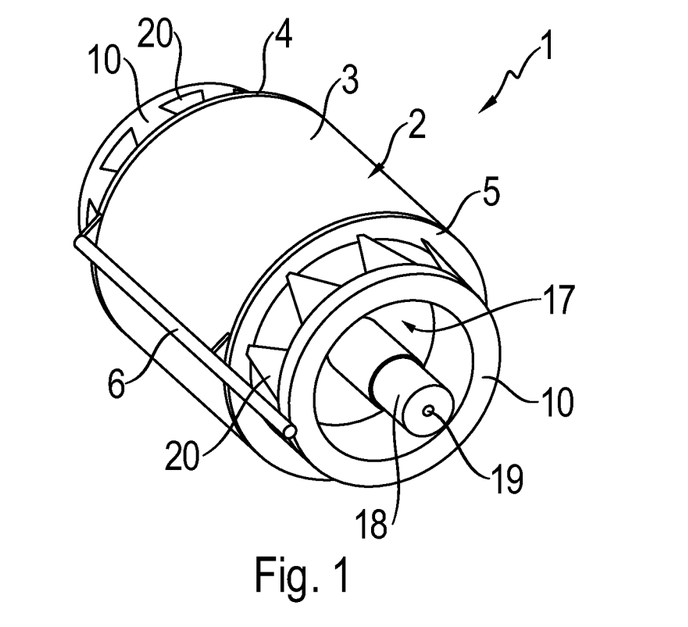
FIG. 1 shows a perspective schematic of an electric machine according to example aspects of the invention.

According to FIG. 1, an electric machine 1 according to example aspects of the invention includes a housing-affixed stator 2 and a rotatable rotor 17, which is arranged within the stator 2 and, in the present case, is partially concealed by the stator 2. The rotor 17 includes a rotor shaft 18 having a cooling duct 19 formed therein. A first end plate 4 and a second end plate 5 are arranged on the end faces of a laminated core 3 of the stator 2. Consequently, the laminated core 3 of the stator 2 is arranged axially between the two end plates 4, 5. Moreover, a cooling line 6 is arranged outside the end plates 4, 5 and the stator 2, which is configured for guiding and introducing a coolant into a particular distribution duct 7 at the particular end plate 4, 5 and, for this purpose, is fluidically connected to the particular distribution duct 7 in the particular end plate 4, 5. The distribution ducts 7 in the particular end plate 4, 5 are not shown in FIG. 1, for reasons related to perspective, although the distribution ducts 7 are represented in the following figures.

Figure 2:
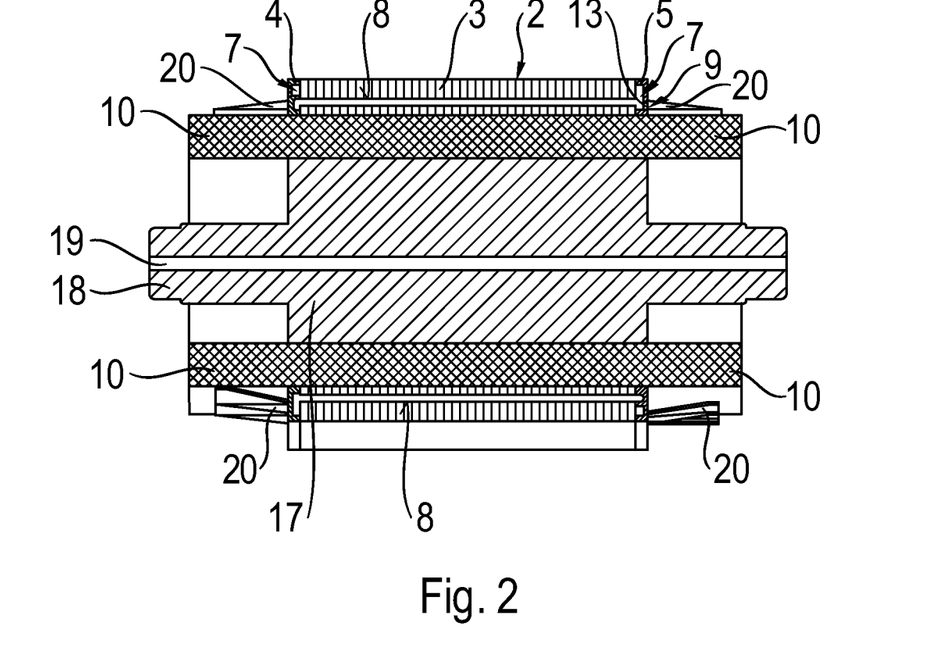
FIG. 2 shows a diagrammatic longitudinal sectional representation of the electric machine according to FIG. 1.

According to FIG. 2, the electric machine 1 according to FIG. 1 is represented in a longitudinal section. In FIG. 2, the cooling duct 19 in the rotor shaft 18 of the rotor 17 is clearly visible, wherein coolant flows through the cooling duct 19 in order to cool the rotor shaft 18. In the present case, the stator 2 is represented in a cutting plane and includes the laminated core 3 arranged axially between the two end plates 4, 5. The laminated core 3 includes multiple axial ducts 8 for guiding coolant through the stator 2. The axial ducts 8 are fluidically connected to the particular distribution duct 7 in the particular end plate 4, 5 for the inflow of the coolant. An outflow for the coolant takes place through multiple end-face openings 9 in the particular end plate 4, 5. The openings 9 are configured for spraying the coolant out of the axial ducts 8 onto winding overhangs 10 of the stator 2 in order, as a result, to also cool the winding overhangs 10 of the stator 2, which extend outwardly on the end faces. A particular orifice 13 is accommodated in the particular opening 9 for adjusting a flow rate and a geometry of a particular coolant jet 20. As a result, a larger wetting of the winding overhangs 10 with coolant is effectuated. The coolant jets 20 spraying out of the openings 9 are also shown in FIG. 1 and FIG. 3.

Figure 3:
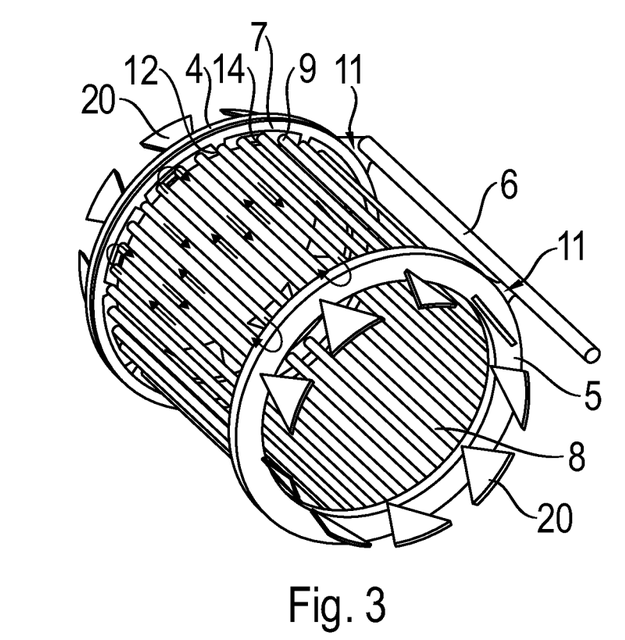
FIG. 3 shows a perspective schematic of two end plates and axial ducts arranged therebetween in a transparently represented stator of the electric machine according to FIG. 1 and FIG. 2.

In FIG. 3, the rotor 17, the rotor shaft 18, and the laminated core 3 of the stator 2 are not shown, wherein only the two end plates 4, 5, the axial ducts 8 formed in the laminated core 3, and the cooling line 6 are represented. An inflow 11 for supplying coolant out of the cooling line 6 is formed at an outer circumference of each of the particular end plates 4, 5. The particular inflow 11 is fluidically connected to the particular distribution duct 7. Consequently, the coolant flows via the particular inflow 11 into the particular distribution duct 7 of the particular end plate 4, 5. The particular distribution duct 7 is formed continuously in the circumferential direction at the particular end plate 4, 5 and includes multiple recesses 12 formed in the radial direction for introducing the coolant into the particular axial duct 8. Moreover, multiple deflection ducts 14 are arranged in the particular end plate 4, 5. The particular deflection duct 14 is configured for deflecting the coolant out of one of the axial ducts 8 into an axial duct 8 adjacent thereto in the circumferential direction. The end-face openings 9 in the particular end plate 4, 5 act as an outflow for the coolant, wherein the coolant is sprayed out of the axial ducts 8 via the openings 9 onto the winding overhangs 10 of the stator 2. The coolant jets 20 represented in FIG. 1, FIG. 2, and FIG. 3 illustrate how the coolant is sprayed out of the openings 9. Due to the perspective representation, the distribution duct 7, the recesses 12, and the deflection ducts 14 in the second end plate 5 are not visible in the present case.

Figure 4:
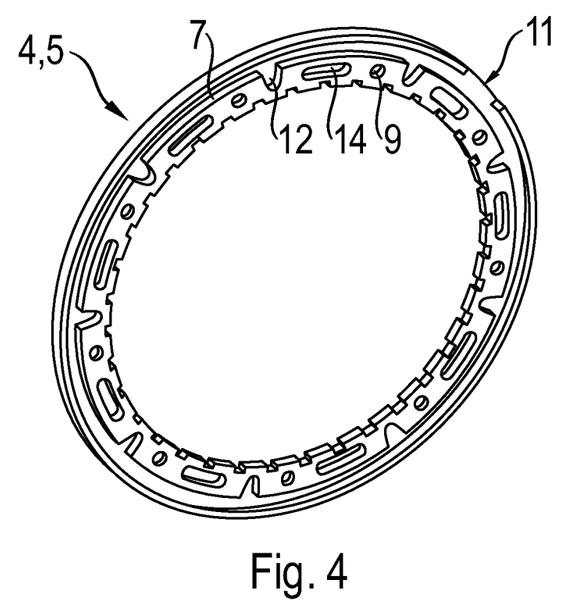
FIG. 4 shows a perspective schematic of one of the two identically designed end plates according to FIG. 3.

FIG. 4 shows one of the two end plates 4, 5 according to FIG. 1 through FIG. 3 in an enlarged perspective representation. The two end plates 4, 5 of the electric machine 1 are identically designed and, in the installed condition, are arranged on the end faces of the laminated core 3. The distribution duct 7 and the deflection ducts 14 are each designed as indentations in the end face of the particular end plate 4, 5 facing the laminated core 3. The inflow 11 for the coolant is also designed as an indentation at the outer circumference of the particular end plate 4, 5 and is fluidically connected to the distribution duct 7. The distribution duct 7 is formed continuously in the circumferential direction at the particular end plate 4, 5 and includes multiple recesses 12 formed in the radial direction for introducing the coolant into the particular axial duct 8. Each deflection duct 14 is formed between a recess 12 and an opening 9 in the circumferential direction. In the present case, the deflection duct 14 always follows the recess 12 in the clockwise direction, wherein the opening 9 follows the deflection duct 14 in each case. According to the present example embodiment, the particular end plate 4, 5 includes nine recesses 12, nine deflection ducts 14, and nine openings 9.

According to FIG. 3, the two end plates 4, 5, in the installed condition at the laminated core 3 of the stator 2, are turned with respect to each other in such a way that the particular recesses 12 at the first end plate 4 are always fluidically connected via a particular axial duct 8 to the particular deflection ducts 14 at the second end plate 5, wherein the particular deflection ducts 14 at the second end plate 5 are always fluidically connected, via one particular further axial duct 8, to the openings 9 at the first end plate 4. Consequently, the axial ducts 8 are configured for being impinged upon by the flow of coolant from the first end plate 4 and the second end plate 5 in alternation in order to establish a homogeneous temperature distribution over the circumference of the stator 2. The arrows in some of the axial ducts 8 and deflection ducts 14 visualize the flow direction of the coolant. According to the present example embodiment, a total of 36 axial ducts 8 are formed in a uniformly distributed manner in the laminated core 3 of the stator 2.

Figure 5:
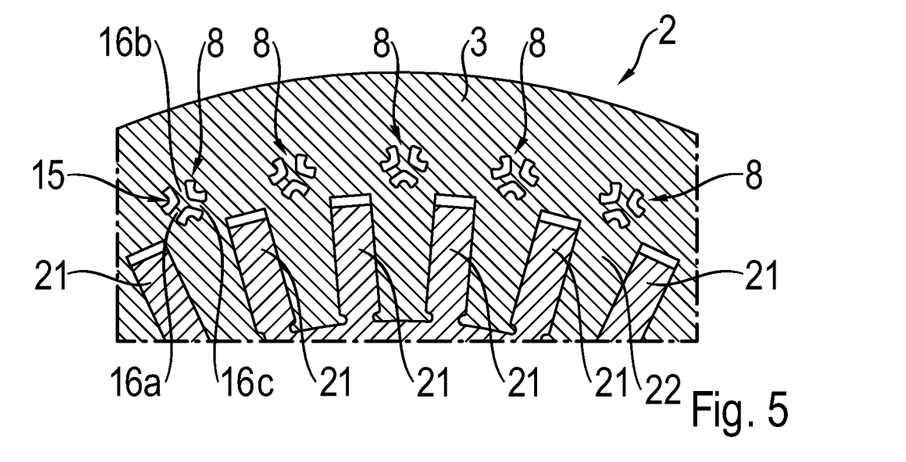
FIG. 5 shows a diagrammatic detailed sectioning through multiple axial ducts of the stator.

In FIG. 5, a detail of the stator 2 is represented, wherein five axial ducts 8 are shown in the laminated core 3 of the stator 2 in the present case. The axial ducts 8 are arranged in the area of stator teeth 22. In the present case, each of the axial ducts 8 is formed centrally between two stator grooves 21 in the circumferential direction and outside the stator teeth 22 in the radial direction. Cooling fins 15 are formed in the axial ducts 8 for improved heat dissipation, wherein the particular cooling fin 15 includes a first web 16a, a second web 16b, and a third web 16c. The three webs 16a, 16b, 16c divide the axial duct 8 into three axial duct areas and extend, at least partially, in the axial direction of the axial duct 8. As a result, an essentially heart-shaped cross-section of the particular axial duct area results.

Figure 6:
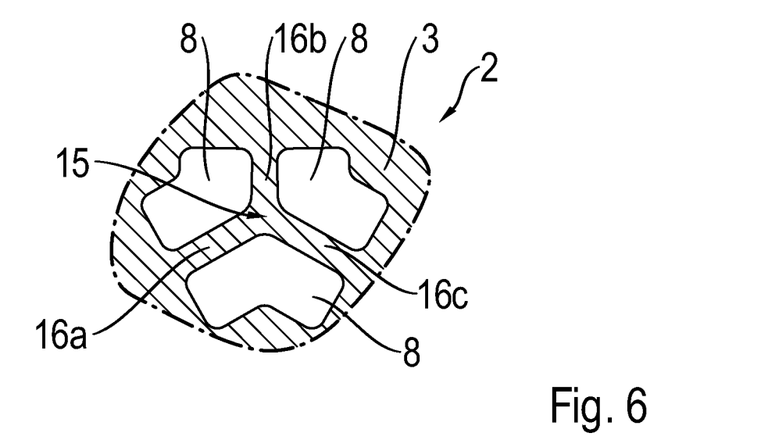
FIG. 6 shows an enlarged detailed schematic of an axial duct according to FIG. 5.

FIG. 6 shows, in an enlarged view, one of the axial ducts 8 represented in FIG. 5. The axial duct 8 formed in the laminated core 3 of the stator 2 extends in a linear manner from a first end face of the stator 2 up to a second end face of the stator 2. The cooling fin 15 formed from the three webs 16a, 16b, 16c extends across the entire length of the axial duct and subdivides the axial duct into the three axial duct areas. The original cross-section of the axial duct 8 without the cooling fin 15 essentially corresponds to a triangle having inwardly rounded corners. This yields, in the present case, the three heart-shaped axial duct areas, which are partially turned and distorted.

Figure 7:
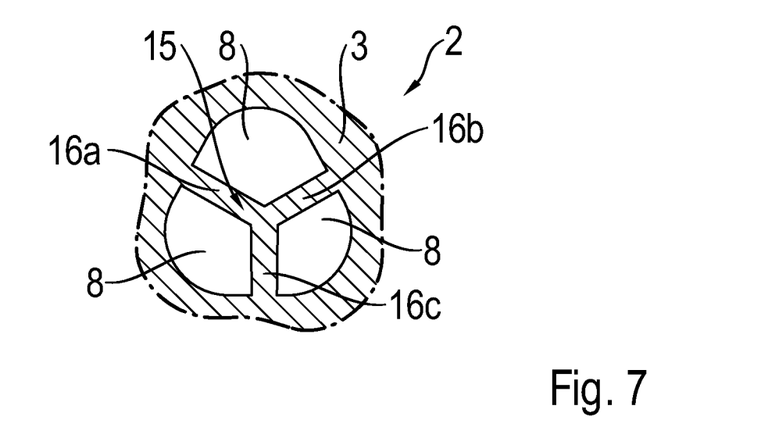
FIG. 7 shows an enlarged detailed schematic of an axial duct according to one further exemplary embodiment.

FIG. 7 shows one further preferred example embodiment of an axial duct 8 in the laminated core 5 of the stator 2. In the present case, a cooling fin 15 is formed in the axial duct 8 for improved heat dissipation. The cooling fin 15 has a first web 16a, a second web 16b, and a third web 16c, wherein the three webs 16a, 16b, 16c divide the axial duct 8 into three axial duct areas. The cooling fin 15 extends in the axial direction of the axial duct 8 and includes a fluid seal, as is also the case for the wall of the axial duct 8 adjacent to the laminated core 5. Therefore, no coolant can leak out of the axial duct 8 into the stator 2 in the radial direction via the laminated core 3. The original cross-section of the axial duct 8 without the cooling fin 15 essentially corresponds to a triangle having outwardly rounded corners. This yields, in the present case, three elliptical arc-shaped axial duct areas, which are partially turned and distorted.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 electric machine
2 stator
3 laminated core
4 first end plate
5 second end plate
6 cooling line
7 distribution duct
8 axial duct
9 opening
10 winding overhang
11 inflow
12 recess
13 orifice
14 deflection duct
15 cooling fin
16a first web
16b second web
16c third web
17 rotor
18 rotor shaft
19 cooling duct
20 coolant jet
21 stator groove
22 stator tooth

The invention claimed is:

1. A stator (2) for an electric machine (1), comprising:
a laminated core (3) arranged axially between a first end plate (4) and a second end plate (5);
a cooling line (6) configured for introducing a coolant into at least one distribution duct (7) at a particular one of the first and second end plates (4, 5), the cooling line (6) arranged outside the first and second end plates (4, 5) and the stator (2), the cooling line (6) fluidically connected to the at least one distribution duct (7) in the particular one of the first and second end plates (4, 5),
wherein the laminated core (3) includes a plurality of axial ducts (8) configured for guiding the coolant through the stator (2), the axial ducts (8) fluidically connected to the at least one distribution duct (7) in the particular one of the first and second end plates (4, 5) as an inlet for the coolant, an outlet for the coolant formed by at least one end-face opening (9) in the particular one of the first and second end plates (4, 5), the at least one end-face opening (9) configured for spraying the coolant out of the axial ducts (8) onto winding overhangs (10) of the stator (2),
wherein a plurality of deflection ducts (14) are arranged in the particular one of the first and second end plates (4, 5), and each deflection duct (14) is configured for deflecting the coolant out of a respective one of the axial ducts (8) into a circumferentially adjacent one of the axial ducts (8), and
wherein one or both of the at least one distribution duct (7) and the plurality of deflection ducts (14) are formed as indentations in an end face of the particular one of the first and second end plates (4, 5) facing the laminated core (3).

2. The stator (2) of claim 1, wherein the at least one distribution duct (7) is formed as an indentation in an end face of the particular one of the first and second end plates (4, 5) facing the laminated core (3).

3. The stator (2) of claim 1, wherein an inflow (11) for the coolant is formed at an outer circumference of the particular one of the first and second end plates (4, 5), and the inflow (11) is fluidically connected to the at least one distribution duct (7).

4. The stator (2) of claim 1, wherein the at least one distribution duct (7) is formed at the particular one of the first and second end plates (4, 5) continuously, at least in sections, in the circumferential direction.

5. The stator (2) of claim 1, wherein the at least one distribution duct (7) includes multiple recesses (12) formed in the radial direction for introducing the coolant into the particular axial duct (8).

6. The stator (2) of claim 5, wherein:
a plurality of deflection ducts (14) are arranged in the particular one of the first and second end plates (4, 5); and
each deflection duct (14) is formed circumferentially between a respective recess (12) and a respective opening (9);
each deflection duct (14) is configured for deflecting the coolant out of a respective one of the axial ducts (8) into a circumferentially adjacent one of the axial ducts (8).

7. The stator (2) of claim 1, wherein the at least one opening (9) is configured for accommodating an orifice (13).

8. The stator (2) of claim 1, wherein the axial ducts (8) are formed in the laminated core (3) such that the axial ducts (8) are distributed over a circumference of the stator (2).

9. The stator (2) of claim 1, wherein the axial ducts (8) are configured such that the flow of coolant from the first end plate (4) and the second end plate (5) alternatingly impinges upon the axial ducts (8) in order to establish a homogeneous temperature distribution over a circumference of the stator (2).

10. The stator (2) of claim 1, further comprising a plurality of cooling fins (15) formed in the axial ducts (8) and configured for heat dissipation.

11. The stator (2) of claim 10, wherein at least one of the cooling fins (15) comprises a first web (16a), a second web (16b), and a third web (16c), and the first, second, and third webs (16a, 16b, 16c) divide the axial duct (8) into three axial duct portions and extend at least partially in an axial direction of the axial duct (8).

12. The stator (2) of claim 1, wherein the axial ducts (8) comprise a fluid seal.

13. The stator (2) of claim 1, wherein the axial ducts (8) are arranged proximate stator teeth (22).

14. An electric machine (1) for driving a motor vehicle, comprising the stator (2) of claim 1.

\* \* \* \* \*